United States Patent [19]

Czeczota

[11] Patent Number: 5,086,695
[45] Date of Patent: Feb. 11, 1992

[54] COMPOSITION FOR THE FOUR-COLOR ENAMELLING BY SERIGRAPHY OF GLASS OBJECTS

[75] Inventor: Stephane Czeczota, Saintes, France

[73] Assignee: Societe Nouvelle d'Applications Serigraphiques, Saintes, France

[21] Appl. No.: 633,208

[22] Filed: Dec. 31, 1990

Related U.S. Application Data

[63] Continuation of Ser. No. 304,195, Jan. 31, 1989, abandoned.

[30] Foreign Application Priority Data

Feb. 5, 1989 [FR] France ................. 88 01389

[51] Int. Cl.⁵ ................. B41F 15/00; C03C 17/34
[52] U.S. Cl. ................. 101/129; 101/211; 101/491; 65/60.8; 65/60.2
[58] Field of Search ............ 101/129, 115, 211, 490, 101/491; 65/60.1, 60.8, 60.2

[56] References Cited

U.S. PATENT DOCUMENTS

3,857,746  12/1974  Blanco et al. ................. 156/89

FOREIGN PATENT DOCUMENTS

0166371   1/1986  European Pat. Off. .
2415087   8/1979  France .
2025929A  1/1980  United Kingdom .

OTHER PUBLICATIONS

Chemical Abstracts, vol. 97, No. 8, 1982, p. 253.

*Primary Examiner*—Clifford D. Crowder
*Attorney, Agent, or Firm*—Sherman and Shalloway

[57] ABSTRACT

Four colored compositions are employed for the marking of glass objects by means of enamels by a four-color serigraphy. Each composition comprises an enamel having a given primary color (red, yellow, blue, black) and a transparency agent which enables these four primary colors to provide all the desired shades by passage in a serigraphy machine.

10 Claims, No Drawings

COMPOSITION FOR THE FOUR-COLOR ENAMELLING BY SERIGRAPHY OF GLASS OBJECTS

This application is a continuation of application Ser. No. 07/304,195 filed Jan. 31, 1989 now abandoned.

The invention relates to a composition for the four-colour enamelling by serigraphy or screen printing of the surface of glass objects, and more particularly to the marking of bottles.

The enamelling of glass objects by serigraphy or screen printing is known.

For this purpose, enamels are used which are in the form of particles coloured for example by metal oxides, these particles being employed in a mixture with a thermomeltable or oily binder provided to facilitate the application through offset films used in serigraphy.

After application, the whole is baked up to the melting temperature of the enamel. In the course of this baking, the binder is evaporated and the particles are deposited on a support, melt and cover the support. By cooling, a continuous layer of enamel is obtained which strongly adheres to the support and has the required properties of brilliancy, hardness, etc.

The melting temperature of the enamel must be chosen in accordance with the support since it must be sufficiently low to ensure that at the melting temperature of the enamel the support is not deteriorated under the action of thermal stresses. Thus, in respect of glass, the enamels employed have a melting temperature of about 580° C., whereas in respect of ceramics, an enamel melting between 650° and 850° C. may be used.

Such enamels intended for use in the enamelling of glass, are applicable by serigraphy or screen printing.

In this method, there are deposited in succession layers of enamel having a given colour by causing the enamel and the molten binder to pass through a stainless steel gauze screen.

It has been found that the layers of enamel applied in succession do not interpenetrate. Thus, applying a layer of blue enamel on a yellow enamel does not result in a green enamel, only the last layer applied, in this case the blue layer, is visible.

In order to obtain a result giving shades of colours, it is consequently necessary to multiply the number of colours to be applied and therefore the number of screens and the number of passes.

An object of the present invention is to overcome this drawback by providing a product whereby it is possible to obtain an excellent result, i.e. composed of all the desired shades, by application of a white undercoat and four basic colours, as is used in printing on paper according to the four-colour printing method.

For this purpose, the invention provides a composition for the enamelling of glass objects of the type comprising a coloured enamel, said composition containing a transparency agent for rendering the coloured enamel transparent at the end of the enamel baking operation.

According to other features of the invention:
the transparent flux consists of cadmiferous lead borosilicate;
the composition comprises between 200 and 400 g of red enamel and about 1000 g of transparency agent;
the composition comprises between 200 and 400 g of yellow enamel and about 1000 g of transparency agent;
the composition comprises between 200 and 400 g of blue enamel and about 1000 g of transparency agent;
the composition comprises between 0 and 500 g of black enamel and about 1000 g of transparency agent.

The invention will be better understood from the following description. There will more particularly be described the use of the compositions according to the invention for the marking of a bottle, this use being given solely by way of example.

The compositions according to the invention, i.e. a white enamel and four primary products may be employed in a serigraphy or screen printing machine for the marking of products of revolution, for example cylindrical and elliptical products, such as provided for example under the reference No. 157 by the Firm DUBUIT at NOISY LE GRAND (FRANCE). Such a machine is of the type having six automatic colours, i.e. it is capable of effecting six layers or coats of different colours in succession and automatically.

The application of the colours is effected through stainless steel gauze screens, the mesh of which is for example 32 $\mu$m. These screens are held taut on frames of wood and the gauze extends by 5 to 6 cm beyond each edge for the purpose of fixing heating electrodes In order to ensure that the application is correct, the screens are prepared before their introduction in the machine, i.e. covered with a photographic solution which, by insolation through an offset film, will obstruct the meshes of the screen which will cover the part of the bottle which is not to be coloured with the composition according to the invention corresponding to the offset film.

To obtain a product adapted for the application for example on a bottle, as mentioned before, it is necessary to employ a product whose viscosity will be adapted to the meshes of the screen at a relatively low temperature, so that the cooling and therefore the hardening is very rapid for the application of the following primary colour. Moreover, the product must be transparent after baking at about 580° C.

There will therefore be used four primary products which will be applied on a white undercoat.

The four primary products according to the invention are obtained by a mixture of coloured enamel and a transparency agent.

To produce the primary products, there were used by way of example products sold by the Firm ETABLISSEMENTS DEGUSSA at LIMOGES (FRANCE):

Magenta primary product:
200 to 400 g of red enamel for glass having a reference VR 272;
1000 g of a transparency agent which is, according to the invention, cadmiferous lead borosilicate sold under the reference C 50-70;

Yellow primary product:
200 to 400 g of yellow enamel of reference VS 68-59;
1000 g of transparency agent C 50-70;

Cyan primary product:
300 to 500 g of blue enamel reference VS 335;
1000 g of transparency agent C 50-70;

Black primary product:
0 to 400 g of black enamel reference VS 384;
1000 g of transparency agent C 50-70.

Note that the proportion of black enamel contained in the black primary product varies as a function of the desired rendering, i.e. the desired final appearance.

The same is true in respect of the other products but, for these, it has been found good results were obtained with preferably 1000 g of transparency agent C 50-70, 300 g of red enamel for the Magenta primary product, 300 g of yellow enamel for the yellow primary product, and 400 g of blue enamel for the Cyan primary product.

Each of these primary products is then reduced to a powder whose particle size is between 5 and 12 μm. This powder is mixed with an oily medium if the screens are of polyester and in a thermomeltable binder if the screen is a stainless steel gauze.

After the preparation of these products, the procedure is as follows:

there is poured onto a screen prepared as indicated hereinbefore, a white enamel (reference VR 290 for example) and the whole is positioned in the cavity provided for the first application by the machine;

the screen corresponding to the Magenta offset film is covered with a Magenta primary product and it is positioned for the application following on the production of the white undercoat;

the same is done with the yellow, cyan and black primary products which will be applied in succession in this order by the machine.

As each screen is connected to heating electrodes, it is heated to 80° C., which will provide a product whose viscosity is adapted to pass through the free meshes of the screen and cover the corresponding surface of the bottle.

By successive applications on a white undercoat of the four primary products according to the invention, after passage in a baking oven at 580° C., an enamelled decoration is obtained which has all the desired shades of colour, owing to the presence of the transparency agent.

Furthermore, as these applications are effected by means of a serigraphy machine operating automatically, the marking requires no other handling apart from the transfer to the baking oven.

The products according to the invention therefore enable glass objects to be enamelled the appearance of which is improved and corresponds to that obtained by four-colour serigraphy or screen printing on white papers. The reduced number of applications reduces the cost of the enamelling, since it reduces the handling and the utilization time of the serigraphy machine.

I claim:

1. A method for serigraphically printing a multicolor design with enamel pigments on a glass object which comprises providing four-color separation of the multicolor design, reproducing each color separation design on a printing screen such that only the screen openings corresponding to the particular color are left open for passage therethrough of a molten enamel coloring composition, depositing an enamel coloring composition for one of the primary colors magenta, yellow, cyan and black on each respective printing screen for the corresponding color separation, said enamel coloring composition for magenta comprising a red enamel and a cadmiferous lead borosilicate frit as a transparentizing agent, said enamel coloring composition for yellow comprising an enamel and a cadmiferous lead borosilicate frit transparentizing agent, said enamel coloring composition for cyan comprising a blue enamel and a cadmiferous lead borosilicate frit transparentizing agent, and said enamel coloring composition for black comprising a black enamel and a cadmiferous lead borosilicate transparentizing frit, successively applying each of said transparentizable enamel color compositions magenta, yellow, cyan and black via a serigraphy machine to the glass object by thermally melting the respective compositions whereby the compositions pass through the printing screen onto the glass object, and heating the covered glass object to thereby form said multicolor design on the glass object.

2. The method of claim 1 which further comprises applying a white thermosettable enamel undercoat on the surface of the glass object and thereafter applying the transparentizable enamel color compositions on said undercoat.

3. Method according to claim 1, wherein the enamel composition for magenta comprises about 20 to 40 parts of red (Magenta) enamel for 100 parts of the said transparency agent.

4. Method according to claim 1, wherein the enamel composition for yellow comprises about 20 to 40 parts of yellow enamel for 100 parts of the said transparency agent.

5. Method according to claim 1, wherein the enamel composition for cyan comprises about 30 to 50 parts of blue (Cyan) enamel for 100 parts of the said transparency agent.

6. Method according to claim 1, wherein the enamel composition for black comprises about 1 to 50 parts of black enamel for 100 parts of the said transparency agent.

7. Method according to claim 1, further comprising applying a white thermomeltable enamel undercoat on the surface of the object to be marked, before effecting the four-colour serigraphy printing.

8. Method of claim 1, wherein the screen is a stainless steel gauze screen.

9. Method of claim 1, wherein the enamel composition contains a thermomeltable binder.

10. Method of claim 1, wherein the heating is carried out at a temperature of about 580° C.

* * * * *